United States Patent [19]

Dukert et al.

[11] 3,779,854
[45] Dec. 18, 1973

[54] POLYVINYLIDENE FLUORIDE LAMINATE CONSTRUCTION AND METHOD

[75] Inventors: Andrew Anthony Dukert, Ambler; Alkis Christofas, Levittown, both of Pa.

[73] Assignee: Pennwalt Corporation, Philadelphia, Pa.

[22] Filed: June 18, 1971

[21] Appl. No.: 154,591

[52] U.S. Cl. ...... 161/156, 117/120 GB, 117/140 A, 117/161 VZ, 156/306, 156/313, 161/189, 161/218, 161/254, 161/256
[51] Int. Cl. ............................................. B32b 27/06
[58] Field of Search .................. 156/307, 306, 313, 156/246, 324; 260/900; 161/189, 81, 82, 88, 155, 156, 247, 254, 256, 204 117/126 GB; 140 A; 161 VZ

[56] References Cited
UNITED STATES PATENTS

| | | | |
|---|---|---|---|
| 3,340,222 | 9/1967 | Fang | 260/900 X |
| 3,378,433 | 4/1968 | Palazzolo et al. | 161/156 |
| 3,069,305 | 12/1962 | Fahrbach et al. | 161/156 X |
| 3,324,069 | 6/1967 | Koblitz et al. | 260/900 X |
| 3,458,391 | 7/1969 | Miller | 260/900 X |
| 3,475,248 | 10/1969 | Brasure | 161/189 X |
| 3,531,432 | 9/1970 | Graver | 260/900 X |
| 2,731,068 | 3/1973 | Richards | 156/324 |

*Primary Examiner*—Alfred L. Leavitt
*Assistant Examiner*—David A. Simmons
*Attorney*—Stanley Bilker

[57] ABSTRACT

A reinforced laminate construction utilizing a sheet-like flexible fibrous or porous matrix whose interstices are impregnated with a resin selected from the group consisting of vinylidene fluoride homopolymers, copolymers and terpolymers applied from a liquid carrier.

9 Claims, No Drawings

POLYVINYLIDENE FLUORIDE LAMINATE CONSTRUCTION AND METHOD

This invention relates to a novel system for applying polyvinylidene fluoride linings to substrates, such as storage vessels, ducts, pumps, pipes, valves, fittings and other shaped articles which are subject to chemical attack or exposed to temperature extremes and corrosive environments. One aspect of the present invention relates to a reinforced laminate which includes a flexible sheetlike fibrous matrix whose interstices are impregnated with a vinylidene fluoride polymer or base resin applied in liquid form from an organic solvent dispersion or free-flowing suspension. Another aspect of this invention concerns a method for forming such reinforced vinylidene fluoride laminates in monolayers or plural layers and either simultaneously with impregnation or subsequently thereto cohesively bonding the laminates to each other for use as a self supporting structure and/or adhesively securing the laminate to the substrate.

The vinylidene fluoride polymers embodied in this invention are well known resins which are extremely useful as a protective coating for a variety of substrates because of the resins' excellent chemical resistance, good weathering properties, and thermal stability. A comprehensive review of the polymerization techniques used in the preparation of vinylidene fluoride polymers may be found in U.S. Pat. No. 3,193,539. The terms "vinylidene fluoride polymer" and "polyvinylidene fluoride" as used herein, refer not only to the homopolymer of vinylidene fluoride, but also to the vinylidene fluoride copolymers and/or terpolymers containing at least about 50 mol percent of vinylidene fluoride. Suitable comonomers are the halogenated ethylenes such as sym.-dichlorodifluoroethylene, 1-chloro-1,2,2-trifluoroethylene, tetrafluoroethylene, vinyl fluoride, vinyl chloride, and the like.

A basic problem encountered in the use of vinylidene fluoride has been the difficulty in bonding these materials to themselves or to other substrates, and in their ability to withstand delamination, cracking and shrinkage when exposed to high and low temperature extremes, localized heating and/or cooling, high humidity conditions or hot gaseous or vapor environments over extended periods of time. That is, vinylidene fluoride has a relatively high coefficient of thermal expansion, it is somewhat subject to high initial and secondary shrinkage characteristics and the unsupported resin itself is rather permeable to hot vapors and gases, such as steam. The foregoing defects in unsupported or unreinforced vinylidene fluoride resins has caused instances of cracking where localized stresses have been created as when abutting sections are cojoined by a hot welded bead or seam. Where a liner or coating of vinylidene fluoride has been bonded to a metal or other substrate by means of rubber and/or synthetic elastomeric or rigid adhesives, severe taxing of the bond occurs because of the differences in coefficient of thermal expansion between the resin liner and the underlying substrate. That is, the bonding interface is subjected to the greater expansion and contraction of the vinylidene fluoride such as to cause growth of the liner at the elevated temperature and to shrinkage thereof at low temperatures. High and low temperatures as well as cycling has thus caused distortion in the liner, breakage of the bond and in general early failure. The high degree of permeability of polyvinylidene fluoride at elevated temperatures has also led to left-off of coated films in certain instances when they are subjected to water vapor and/or gases.

Use of other polymerized resins wherein the film, sheet, or backed coatings were partially cured and remained tacky for a period of time prior to application (termed "B" stage) resulted in liner lay-ups which had extremely limited shelf life. That is, the incorporation of an inhibitor to the resin in order to impede curing would not permit the sheets to be stored above 80° F. without detracting from ultimate use.

The use of elastomeric media at the interface has resulted in only a limited improvement in solving the difficulties caused by the differential thermal expansion of unsupported, unfilled polyvinylidene fluoride. The conventional means of utilizing plastic filler materials to minimize expansion and contraction behavior has resulted in loss of other desirable properties, such as tensile, impact strength, and elongation or bond strength when the film or sheets are bonded to themselves or to a substrate.

It is therefore an object of the present invention to provide a method for applying liners of vinylidene fluoride homopolymers, copolymers, and terpolymers to substrates whereby the high coefficient of thermal expansion, shrinkage and high permeability characteristics are overcome.

Another object of this invention is to provide a polyvinylidene fluoride laminate which is adapted to be easily draped and adhered to an underlying substrate either as a single or multiple layer configuration without suffering delamination from the effects of temperature, aging or humidity.

Yet another object of this invention is to provide a vinylidene fluoride homopolymer, copolymer and/or terpolymer laminate which may be adhesively secured to a substrate by wet or dry lay-up or built up or bonded to itself in plural layers during different intervals of time and adapted to be shaped to the contour of the substrate with conventional forming tools.

Still a further object of this invention is to provide a vinylidene fluoride laminate which can withstand temperature conditions up to 600° F without loss of adhesion to the substrate or cohesion between the individual laminate layers even though the resin segment is in the melt state.

Other objects of this invention are to provide an improved vinylidene fluoride lamination, and a method for preparation thereof which is easily and economically produced, sturdy in construction and highly efficient and effective in operation.

The present invention contemplates the preparation of a laminate by impregnating an absorptive, porous or fibrous flexible matrix (sheetlike reinforcing medium having interstices) with a dispersion or solution of a vinylidene fluoride homopolymer, copolymer or terpolymer. Examples of vinylidene fluoride dispersions are set forth in U.S. Pat. No. 3,441,531 in which substantially water-free powdered vinylidene fluoride is mixed with a latent solvent. The term "latent solvent" is defined as an organic liquid having a boiling point over 50° C and which has no significant solvent or swelling action on vinylidene fluoride at room temperature, but at an elevated temperature exerts a solvent action sufficient to cause the vinylidene fluoride polymer particles to coalesce. The polymeric dispersion comprises about 100 parts by weight of solid particulate polyvinylidene fluoride dispersed in from about 80 to about 300 parts by weight of the organic latent solvent and in admixture therewith presently from about 0.01 to 2 parts by weight per 100 parts by weight of a cationic surfactant (salts of quaternary ammonium bases). Pigments, such as titanium dioxide, carbon black, zinc oxide, zinc sulfide, chrome oxide, and phthalocyanines, may be added in varying amounts from about 30 to about 100 parts by weight per 100 parts of vinylidene fluoride polymer. Fillers, such as mica flakes, metal powders, silica, clay, finely ground glass, etc., may also be included in varying amounts as desired.

The flexible supporting matrix may be any porous or absorptive sheet whose interstices are capable of being impregnated by the vinylidene fluoride polymer as the latter is applied from its liquid carrier. Examples of such reinforcing or supporting matrices are wire mesh, glass cloth, fiber matte, rovings, woven, pressed and random fiber fabrics, including braided, spun filament and/or pressure wound tapes, ribbon, sheets and veils of an interstitial or porous nature. The essential characteristics of the supporting medium will depend upon the nature of the environment to which the ultimate lining is to be exposed, but in general, the reinforced matrix should be flexible and capable of being draped upon the underlying substrate. The general technique for applying the polyvinylidene fluoride liquid to the matrix may be by dipping, spraying, brushing by doctor blade, reverse roll coating, frictioning, squeegee or the like. The impregnated matrix may then be applied as a wet lay-up to the substrate or the impregnated sheets may be dried in an oven at from 120° to 320° C, and later laminated together or to a substrate with conventional heating and pressure tools. Successive layers may be added as required.

The following examples will serve to illustrate the invention:

EXAMPLE I

Bands of glass cloth, plain weave (with a Volan finish) approximately .020 inch thick are impregnated by dipping the cloth in a dispersion of 40 parts by weight of vinylidene fluoride polymer dispersed in 60 parts of a 70/30 mixture of dimethyl phthalate and di-iso-butyl ketone. Excessive dispersion is squeezed off by passing between two squeeze rolls and the solvents evaporated by passing through an air circulating oven maintained at 500° F.

The resultant impregnated sheets have a polymer pick-up of 70 to 100 percent of the weight of the glass cloth and can be stored until used.

EXAMPLE II

Bands of glass cloth as above were impregnated by dipping in a 40 percent solution of a 70 vinylidene fluoride-30 percent tetrafluoroethylene copolymer in acetone. Excess solution is squeezed out and the solvent evaporated in an oven at 60°–70° C. The impregnated dry cloth was more pliable than the one obtained from Example I and could be stored indefinitely. Pick-up of polymer ranging from 30–70 percent of the weight of the glass cloth can be obtained at will by adjusting the travel time in the solution and the pressure of the squeeze rolls.

EXAMPLE III

Glass cloth "satin" weave with a Volan finish is coated on both sides by spraying with a dispersion of polyvinylidene fluoride in a 70/30 latent solvent mixture of dimethyl phthalate and di-iso-butyl ketone to a total pick-up of 50–100 percent polymer based on the weight of the cloth after evaporating the solvents. The solvent is evaporated by passing the cloth through a hot air circulating oven maintained at 500° F.

EXAMPLE IV

A. Glass cloth as in Example III is coated with a dispersion having the following composition:

| | |
|---|---:|
| Dimethyl phthalate | 1,245 grams |
| Di-isobutyl ketone | 623 grams |
| Isophorone | 207 grams |
| Polyvinylidene fluoride fine powder | 1,225 grams |
| Mica flakes grade 325 mesh (water ground mica) | 337 grams |
| Stainless steel fine powder | 338 grams |

The solvents are evaporated from the cloth as previously and the resulting impregnated cloth held for further processing.

EXAMPLE V

Pieces of glass fiber mat with a Volan finish were impregnated as above with:

a. The polyvinylidene fluoride dispersion described in Example I.

b. The dispersion described in Example IV.

The coated pieces are dried as in the previous examples.

EXAMPLE VI

Glass cloth as above is coated with a .005 – .020 inch thick polyvinylidene fluoride film by an extrusion coating process. In this operation a molten layer of polymer of appropriate thickness is pressed as it emerges from the die of the extruder by a heated revolving cylinder against one face of the cloth supported and advancing by another heated cylinder. Better results are achieved when the glass cloth is heated to 300°–500° F by a battery of infra-red lamps before it reaches the line of contact with the melt between the two cylinders.

It is found that by adjusting the thickness of the extruded film and the pressure of the rolls one can obtain either a glass cloth having only one surface strongly bonded to the polymer film or a glass cloth almost entirely embedded in the polymer melt.

If it is desired to coat only one side with polymer and leave the other surface completely free for subsequent reinforcement with compounds adhering to the glass cloth directly or with the use of coupling agents or adhesives, precoating one surface of the cloth with a thin layer of 10–20 percent solution of polymer in dimethyl acetamide or other appropriate solvent enhances considerably the bond with relatively low pressures.

With the solution precoated glass fabric, a coated glass cloth about 0.040 inch to 0.080 inch thick can be made which has one face completely free from polymer while the other face is strongly bonded to the polymer. If such thicknesses are desirable without precoated glass fabric, the pressure necessary to bond uncoated glass cloth usually forces the melt through the glass fibers at the second surface.

The above precoating method is also useful when a thick polymer layer is desired in the one face which, for example, will be used as the interior surface of a vessel, but, the construction requires that a certain amount of melt must reach the other surface in order to obtain a continuous polymer phase throughout the subsequent layers of the laminated construction. This can be achieved by simply applying higher pressure during the glass cloth-polymer melt laminating process.

EXAMPLE VII

Glass yarn, glass roving, and stranded steel wire (.020 inch total diameter) are coated with .001 inch–.030 inch polyvinylidene fluoride by two methods:

a. By passing the yarn, twisted fiber or stranded wire polyvinylidene fluoride through a polymer dispersion in dimethyl phthalate or other appropriate polymer latent solvent, evaporating the solvent, and fusing the polymer by passing through an oven.

b. By extruding a polymer coating containing a temporary plasticizer using procedures well known in the art of extrusion wire coatings.

The above described constructions may be used in fabricating laminated sheets for lining articles within the scope of this invention, as for example, described below:

EXAMPLE VIII

From 1 to 10 plies of vinylidene fluoride polymer impregnated matrices as described in Examples I, II or VI are heated to temperatures above the melting point of the polymer (about 300° to 350° F) by passing through an oven, a battery of infra-red heaters, or through the field of a high frequency preheater and then pressing together two or more plies between the polished platens of a press in the case of pre-cut lengths or between polished and heated cylinders in the case of substantially continuous lengths.

In a representative arrangement, the plies are superimposed so that the first ply facing the bottom plate of the press or cylinder has a heavy polymer layer (.010 inch to .060 inch thick). The next three or more layers should have a polymer pick-up of 60 to 100 percent on the weight of glass cloth. The last layer on the side facing the top platen or cylinder should have an exposed heavy glass cloth backing. This upper surface may be the outside of the formed vessel to which additional reinforcement of glass reinforced polyesters or epoxy can be bonded. The laminates produced as above may be cut to the desired size and formed to any shape by heating and welding.

EXAMPLE IX

Glass cloth, plain weave, Volan finish was coated with a dispersion having the following composition:

| | |
|---|---|
| Dimethyl phthalate | 1,245 grams |
| Di-isobutyl ketone | 623 grams |
| Isophorone | 207 grams |
| Polyvinylidene fluoride fine powder | 1,225 grams |
| Mica flakes, grade 325 mesh (water ground mica) | 337 grams |
| Aluminum flake powder | 338 grams |

A metal substrate was first cleaned and sandblasted, then coated with the dispersion by spray. The glass cloth was applied immediately to this wet surface. Additional dispersion was applied by brush and smoothed out to eliminate air entrapments and to insure intimate contact and alignment with the compound curved surface. The solvents were evaporated from the cloth/metal structure by exposure to 450°–500° F. in a circulating air oven. Infra-red lamps or other heat source could have been used.

Single and multiple layers were applied. Heating to dissipate the solvents between each layer was necessary to prevent blistering. Successive layers were fully impregnated with brush and roller coater, again smoothing out to insure against air entrapment and conformance with compound surface.

EXAMPLE X

Glass cloth as in Example IX was applied over flat and compound curved metal surfaces which were previously prepared with a tetrafluoroethylene non-stick surface. After single and multiple layers were applied and curved, sheet and curved laminates were stripped from the conforming surfaces and retained their profile even when heated to 300° F. without subsequent shrinkage or distortion.

EXAMPLE XI

Glass cloth tape, plain weave, silane finish was coated with a dispersion having the following composition:

| | |
|---|---|
| Dimethyl phthalate | 1,250 grams |
| Di-isobutyl ketone | 625 grams |
| Isophorone | 200 grams |
| Polyvinylidene fluoride fine powder | 1,250 grams |
| Stainless steel fine powder | 600 grams |

The impregnated tape was spirally wound around a collapsible mandrel whose surfaces had been previously treated with a tetrafluoroethylene non-stick coating. Single and multiple layers were applied and cured. Several tubes had layers all spirally wrapped in one direction and several had the spiral reversed every other layer. Shrinkage, thermal coefficient of expansion and permeation were practically eliminated when compared with equal thickness unsupported polyvinylidene fluoride tubing. Modulus, burst strength, and other physical properties were greatly enhanced.

EXAMPLE XII

A cylindrical process vessel is fabricated using the following procedure:

A. A laminate is formed by superimposing with heat and pressure plies of the following composition:
1. Ply No. 1—glass cloth 0.010 inch – 0.080 inch thick embedded in polyvinylidene fluoride by extrusion coating as in Example VI.
2. Ply No. 2 — satin style glass cloth (Volan finish) impregnated with polyvinylidene fluoride dispersion (100 percent pick-up) as in Example III.
3. Ply No. 3 — same as ply No. 2.
4. Ply No. 4 — satin style glass cloth (Volan finish) impregnated with polyvinylidene fluoride dispersion as in Example III to 50–60 percent pick-up.
5. Ply No. 5. — same as ply no. 1.
6. Ply No. 6. — satin finish glass cloth impregnated with polyvinylidene fluoride dispersion as in Example IV to act as a corrosion barrier.
7. Ply No. 7. — plain weave glass cloth (Volan finish) as in the last step of Example VIII.

B. The laminates are cut in the following pieces according to the pattern so they can be assembled to the desired shape:
1. The side of the cylinder
2. The bottom of the cylinder
3. A flange for the top of the cylinder
4. A cover for the cylinder.

C. The piece from which the cylindrical wall is to be formed is placed in an oven maintained at 300°–350° F. At this temperature the laminate becomes limp and pliable, but it can be handled without distortion or wrinkling which is not the case with plain, non-reinforced polyvinylidene fluoride sheet.

D. The hot "cylindrical wall" laminate is wrapped around a cylinder, made from sheet metal, wood or even cardboard, whose O.D. is equal to the I.D. of the vessel to be constructed. The two ends are formed to abut each other or overlap according to the preferred construction and are pressed against the forming core with a hot flat bar or other appropriate tooling. The laminate is then strapped in position until the assembly cools to room temperature. At this stage, the cylindrical forming core can be removed, the cylinder wall now holding its form accurately. If for any reason the operation should be repeated, the laminate can be flattened again without distortion or shrinkage by reheating. This is another advantage over extruded, non-reinforced polyvinylidene fluoride sheet.

E. The abutting or overlapped ends of the cylindrically formed laminate, as the case may be, are brush-coated or suitably smeared with a cement having the following composition:

| | |
|---|---|
| Polymethyl Methacrylate | 10 grams |
| Dimethyl Acetamide | 80 grams |
| Polyvinylidene fluoride | 10 grams |

After the joint is formed it is covered with a heating tape (ribbon containing heating cells) separated from the joint by a thin sheet of polytetrafluoroethylene and clamped.

By connecting the heating tape to a source of electric current the joint is heated at 200°–300° F, at which temperature the solvent evaporates and the two sections are permanently joined together.

F. In order to reinforce the joint, a 1/2 inch–1 inch wide strip cut from the ply No. 1 is applied as a "cap welding strip" on both surfaces of the joint by suitable means such as a hot air welding tool. This welding strip prepared from the laminate is greatly superior to ordinary extruded, non-reinforced polyvinylidene fluoride ribbon since it can be heated strongly to a point at which it becomes soft and pliable and can develop a strong grip without distorting, deforming, or changing substantially in thickness following application of pressure necessary to develop a satisfactory bond.

The welding operation will be faster and can develop a grip with less prolonged heating if the surface on which the welding strip is to be applied is first coated with a layer of the adhesive mentioned above. The solvent is removed by the hot air during the welding operation.

G. To form the bottom of the vessel, a forming base is constructed from wood or other suitable material. This base has the shape of the desired inside surface of the bottom and a dimension equal to the O.D. of the already formed cylindrical wall. The forming base is well sanded and covered with a thin film of silicone grease.

The piece of "bottom" laminate is cut to the proper size and heated in an oven at 350°–400° F. and applied to the forming base which has been heated to 200°–250° F. The bottom is then forced to shape by using a conventional forming rig. Two way stretch glass fabric will prevent formation of creases during this type of fabrication.

The forming base can be constructed in sections for easy removal from the formed laminate.

In the event that construction of more than one vessel of the same size and configuration is required, the forming can be properly mechanized, or the forming base can be used in a vacuum forming machine.

H. To form the flange, a ring of the proper size is cut from the laminate, clamped between conventional forming rings and heated to 350°–400° F. The interior portion of the heated annulus is then inwardly flared to correspond to the O.D. of the cylindrical wall.

I. To assemble the vessel:
1. A layer of adhesive described in paragraph E of this Example is applied to a 1 inch wide band around the two ends of the cylinder.
2. A layer of adhesive approximately .005 inch thick is applied on the inside flared portion of the flange, as well as its edge, and dried at 250° F.

The vessel is now permanently assembled and can be safely and easily welded by applying welding strips of polyvinylidene fluoride impregnated glass cloth reinforced laminates about any exposed seams outside and inside the vessel.

J. Around the outside of the vessel may be built a reinforcing shell 1/2 inch thick using a glass-mat reinforced epoxy resin by a method well known in the art as "wet lay up." Although many epoxy or catalyzed polyester formulations may be used successfully, a formulation which gives very strong adhesion and excellent overall results is as follows:

| | |
|---|---|
| Epoxy (Araldite 110 or other equivalent resin) | 100 parts by weight |
| Versamide 125 75 pbw<br>Diethylamino-ethanol 25 pbw | 30 parts by weight |

Each layer is cured for 4 hours at room temperature before the next layer is applied until the final built-up dimensions are achieved.

In this manner a vessel is obtained whose inside surface is pure polyvinylidene fluoride, an intermediate layer from a mixture of polyvinylidene fluoride mica, stainless or other appropriate compound which act as ionic permeation barriers, and an outer surface of Volan, or silane-finish glass cloth to which is strongly anchored a reinforcing shell constructed from glass mat impregnated with epoxy resin.

A vessel constructed as in Example XII was tested by:

a. Subjecting to steam at a pressure of 8 lb/in$^2$ for 1,000 hours. No delamination nor permeation was observed and practically no dimensional change was evident.

b. Filling with boiling 15 percent NaOH solution and holding at boiling for 300 hours.

c. The concentration of the NaOH was then increased to 25 percent and the solution maintained boiling for 200 additional hours.

After the test the vessel was intact without any signs of chemical attack or delamination.

8 inch × 8 inch pieces of the Example VIII laminate were bonded to steel plates 8 inches × 8 inches × 1/4 inch using the epoxy composition of Example IX(J).

8 inch × 8 inch pieces of the Example IX wet lay up laminate to steel were prepared.

These bonded constructions in accordance with Examples VIII and IX were then attached to the interior of closed steel sheets in such a way that the laminate formed the inside of two sides of the cell. Next the cell was subjected to 30 psi steam at a temperature of 250° F.

As a comparison, 8 inch × 8 inch extruded polyvinylidene fluoride was laminated by heat and pressure to one side of Volan finish, plain weave, glass cloth. This side was next attached to the steel plates using the same epoxy composition set forth above.

After 200 hours exposure the plain coated polyvinylidene fluoride extruded sheet lost adhesion and was severely distorted. The panels with the impregnated polyvinylidene fluoride glass cloth laminates were intact after 3,248 hours. However, when the laminate was removed from the steel plate with a chisel, the steel didn't show any sign of attack from oxidation.

EXAMPLE XIII

A laminate was constructed as in Example VIII using impregnated glass cloth prepared in Example III with a solution of 20 parts of a copolymer of 70 percent polyvinylidene fluoride and 30 percent tetrafluoroethylene.

This laminate had a greater adhesion between the plies and could be tenaciously attached to the surface of degreased and sandblasted steel by heating at 350° F and applying pressure in the range of 200–400 lb/in².

Still another manner of forming vessels is to wind glass yarn, roving or ribbon impregnated with polyvinylidene fluoride, as in Example VII, about a rigid waste mandrel. It is advantageous that the last layers of the windings utilize polyvinylidene fluoride coated wire in order to impart additional rigidity and strength. The finished construction is heated in an oven above the melting point of polyvinylidene fluoride in order to complete lamination.

Provisions for application of internal air pressure during fusion of the polyvinylidene fluoride will enhance a completely void-free lamination.

In all the above cases, 15–20 percent latent solvent retained in the laminate will facilitate flow during welding. The solvent can be completely expelled by heating the finished construction at a temperature of 300°–500° F.

As is apparent from the foregoing description, vessels may be fabricated from polyvinylidene fluoride polymers, copolymers and terpolymers in a system which exhibits minimal expansion and shrinkage and highly resistant to permeation. In addition, self-sustaining vessels may be fabricated without additional reinforcement. Thus, the chemical and weathering resistance of polyvinylidene fluoride is combined with excellent adhesion and stability at temperatures approaching the melting point of the resin itself.

Although this invention has been described in considerable detail, such description is intended as being illustrative rather than limiting, since the invention may be variously embodied without departing from the spirit thereof and the scope of the invention is to be determined as claimed.

What is claimed is:

1. A reinforced laminate construction comprising a flexible sheetlike matrix having interstices impregnated with at least 30 percent by weight of polyvinylidene fluoride resin applied from a liquid carrier, said polyvinylidene fluoride impregnated sheetlike matrix being in face-to-face contacting adherent disposition with at least one substrate of the class consisting of (1) a second sheetlike fibrous matrix having interstices impregnated with polyvinylidene fluoride resin applied from a liquid carrier (2) metallic surfaces and (3) non-metallic surfaces.

2. The laminate of claim 1 wherein the polyvinylidene fluoride is selected from the group consisting of homopolymers, copolymers and terpolymers.

3. The laminate of claim 1 wherein the polyvinylidene fluoride is applied from a resin dispersion containing at least 50 mol percent of vinylidene fluoride resin in a latent solvent.

4. The laminate of claim 1 wherein the matrix is selected from the group consisting of glass cloth, wire mesh, cellulosic matte, braided fabrics and spun filament, pressure wound tapes, ribbon and sheet.

5. The laminate of claim 1 including a plurality of plies of impregnated matrix in face-to-face cohesive disposition.

6. The laminate of claim 5 wherein the outermost layer includes a film of polyvinylidene fluoride extruded upon the exterior surface of the matrix.

7. A method of forming a polyvinylidene fluoride liner comprising the steps of impregnating at least one sheet of a flexible porous matrix with polyvinylidene fluoride resin dispersed in a liquid carrier such that the pickup by the matrix is substantially at least 30 percent by weight of resin, and applying the impregnated matrix in face-to-face adherent disposition with the surface of a substrate.

8. The method of claim 7 whereby the liner includes a plurality of matrix plies to define a multilayer laminate, each ply being dried at elevated temperature below the melting point of the polyvinylidene fluoride until substantially all of the liquid carrier is expelled, and then coadhering the plies together at elevated temperature and pressure.

9. The method of claim 8 wherein the outermost layer is formed by extruding a coating of polyvinylidene fluoride to the exterior surface thereof.

* * * * *